United States Patent [19] [11] 3,856,915
Pagnozzi et al. [45] Dec. 24, 1974

[54] SOLVENT RECYCLE PROCESS FOR RECOVERY OF RHENIUM FROM MOLYBDATE SOLUTIONS

[75] Inventors: L. Rita Pagnozzi; Tai K. Kim; John M. Laferty; Martin B. MacInnis, all of Towanda, Pa.

[73] Assignee: GTE Sylvania Incorporated, Stamford, Conn.

[22] Filed: May 19, 1972

[21] Appl. No.: 255,233

[52] U.S. Cl................. 423/49, 423/54, 75/101 BE
[51] Int. Cl............................................. C01g 47/00
[58] Field of Search................... 423/49, 54, 658.5; 75/101 BE; 23/312 ME

[56] References Cited
UNITED STATES PATENTS

| | | | |
|---|---|---|---|
| 3,244,475 | 4/1966 | Churchward | 23/312 ME |
| 3,293,004 | 12/1966 | Musgrove et al. | 23/312 ME |
| 3,357,821 | 12/1967 | Henrickson | 23/312 ME |
| 3,558,268 | 1/1971 | Prater et al. | 423/49 |

FOREIGN PATENTS OR APPLICATIONS

| 246,105 | 7/1963 | Australia | 23/312 ME |
|---|---|---|---|

*Primary Examiner*—Herbert T. Carter
*Attorney, Agent, or Firm*—Norman J. O'Malley; Donald R. Castle; William H. McNeill

[57] ABSTRACT

Recovery of rhenium from molybdate solutions in substantially theoretical yields can be achieved by sampling the extractant solution after stripping rhenium and adding sufficient active extractant to attain substantially the same rhenium extraction and separation efficiency that is achieved with a comparable extractant solution prior to initial contact with molybdate-rhenium solutions.

5 Claims, 2 Drawing Figures

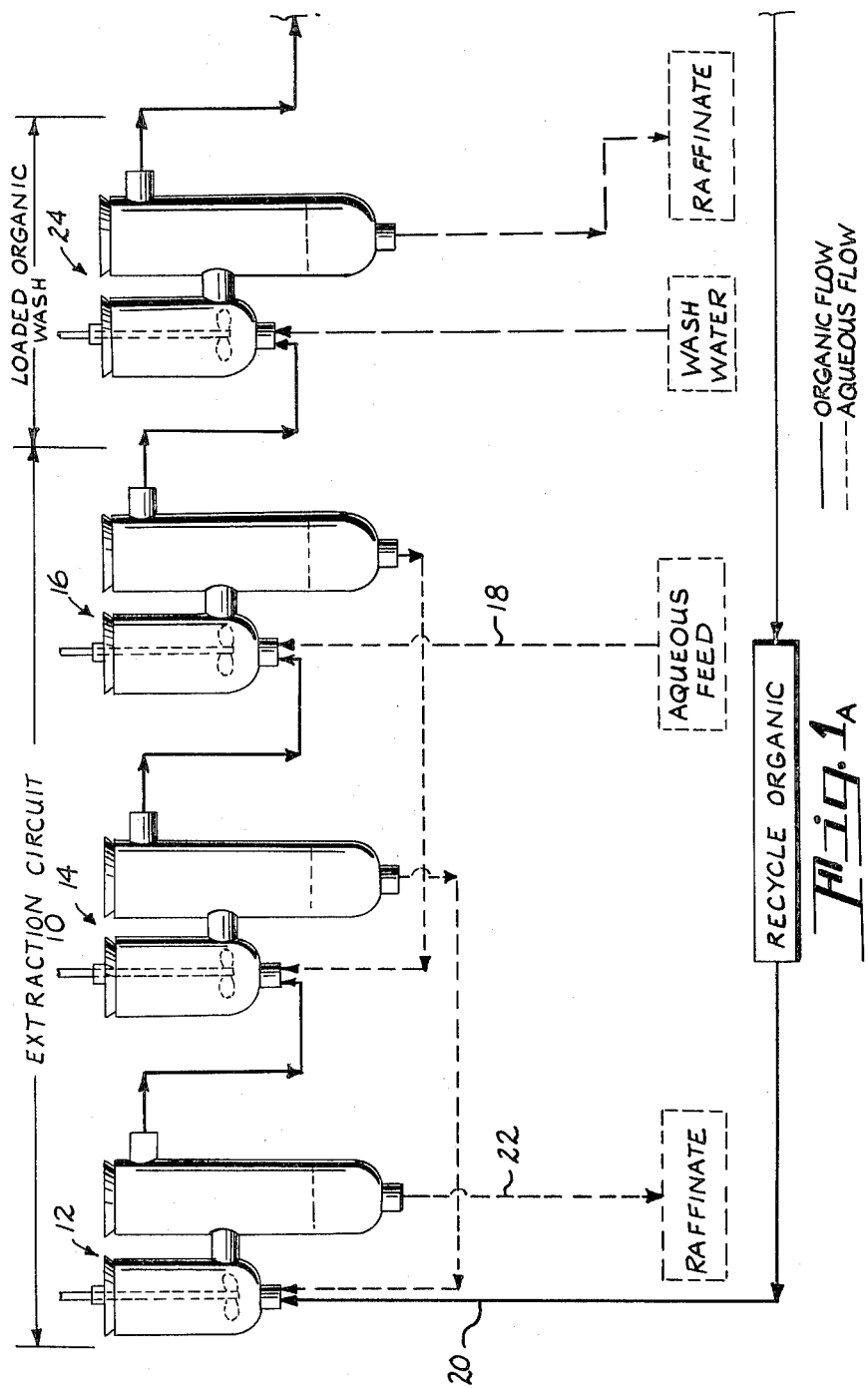

SOLVENT RECYCLE PROCESS FOR RECOVERY OF RHENIUM FROM MOLYBDATE SOLUTIONS

CROSS-REFERENCE TO RELATED APPLICATIONS

Co-pending U.S. Pat. application Ser. No. 255,234, filed concurrently herewith and assigned to the same assignee as the present invention is directed to a process for stripping the rhenium values from an organic extraction solution. The process described therein can be used to recover the rhenium values from the extraction solution disclosed in the present application as well as recovering rhenium values from prior art extractant solution. Other stripping agents can be used to recover rhenium from the extraction solution disclosed in the present application.

BACKGROUND OF THE INVENTION

1. Field of the Invention

This invention relates to the separation of rhenium from molybdate solutions. More particularly, it relates to a continuous process for the extraction of rhenium from aqueous molybdate solutions.

2. Prior Art

Rhenium is often present in small amounts in molybdenite concentrates. For example, molybdenite concentrates formed as a by-product from the recovery of other metals from ores such as copper contain small amounts of rhenium, generally in the order of from 0.4 to 4 pounds per ton of concentrate. Recovery of even these rhenium values can aid appreciably in lower overall manufacturing costs because of the high cost of rhenium. Usually these concentrates are roasted to recover the molybdenum as molybdenum oxide and the rhenium values are volatilized. The rhenium values are then recovered from the flue dusts and gases by contacting them with water or some other solvent, such as an acidic or basic medium. The rhenium values are then extracted from such rhenium bearing solutions by ion-exchange. According to U.S. Pat. No. 2,876,065, the impure clarified rhenium solution is passed through ion-exchange equipment in intimate contact with a strongly basic alkylamine-type synthetic resin. Examples of commercially available resins are Amberlite IRA-400 and Dowex 1X8. After eluting to remove molybdenum and other impurities, the rhenium is eluted with a strong mineral acid such as perchloric acid. Rhenium sulfide ($Re_2S_7$) is precipitated from the rhenium-bearing acid solution by $H_2S$ gas. The rhenium sulfide is then oxidized and converted to $NH_4ReO_4$ by the addition of $NH_4OH$. The $NH_4ReO_4$ is crystallized by evaporation.

A similar process is disclosed in U.S. Pat. No. 3,244,475 except that a liquid ion exchange material is used instead of an ion exchange resin to recover the rhenium. The rhenium values are recovered from the aqueous solution by means of a quaternary ammonium compound carried in kerosene with primary decylalcohol as the solubilizer. The foregoing process is also described in Bureau of Mines Report of Investigation No. 6246 entitled "Sources and Recovery Methods for Rhenium." The amine is stripped with dilute perchloric acid and $NH_4ReO_4$ is recovered in much the same manner as is disclosed in U.S. Pat. No. 2,876,065. In the foregoing Report No. 6246 it is disclosed that various acids and salt solutions were tried and only perchloric acid and perchlorate salt solutions were effective in removing rhenium from the organic.

More recently, however, U.S. Pat. No. 3,558,268 discloses a process similar to the above processes in which ammonium thiocyanate ($NH_4SCN$) is used as the stripping agent and crystallization of $NH_4ReO_4$ directly from the $NH_4SCN$ solution is claimed, thereby eliminating the sulfide precipitation and oxidation steps.

There are several disadvantages with the foregoing processes which result in recovery of appreciably less than all of the rhenium initially present in the solutions. For example, the molybdenum must be separated from the rhenium by roasting prior to the recovery of rhenium and that technique generally results in up to about 50% loss of rhenium. Additionally, after the recovery of rhenium by the extraction processes mentioned, the raffinate discarded contains 0.01 g Re/l. This concentration is often higher than that found in some concentrates. Also, reuse of the organic solution as the salt from perchlorate, thiocyanate, etc. which result after stripping with the agents previously disclosed, sharply lowers the extraction coefficients. The decrease in the extraction capacity with use is believed to be associated with the insolubility of the loaded amine in the decylalcohol-amine-kerosene system. The foregoing problem has resulted in most processes being conducted batch-wise rather than continuous and seldom are the organics regenerated.

It is believed, therefore, that a process that enables recovery of essentially all of the rhenium and an organic extraction solution that can be regenerated without an appreciable loss in extractive capacity is an advancement in the art.

OBJECTS AND SUMMARY OF THE INVENTION

It is an object of this invention to provide a continuous method for the extraction of rhenium from molybdate solutions.

It is another object of this invention to provide a method for the recovery of essentially all of the rhenium from molybdate solutions containing same.

It is an additional object of this invention to provide a method wherein a solvent extraction system can be continuously recycled without an appreciable loss of rhenium.

These and other objects are achieved in one embodiment of the present invention comprising:

a. establishing an initial rhenium extraction efficiency of an organic extraction solution prior to contacting a molybdate solution containing rhenium, b. extracting the rhenium values from the molybdate solutions into the extraction system, c. removing rhenium from the extraction solution, d. measuring the rhenium extracting efficiency of the extraction solution, and e. adding sufficient active extractant to the solution to attain substantially the initial rhenium extraction efficiency.

BRIEF DESCRIPTION OF THE DRAWING

The drawing is a flow sheet depicting one embodiment of this invention.

DETAILED DESCRIPTION OF THE PREFERRED EMBODIMENTS

Figure 1B:
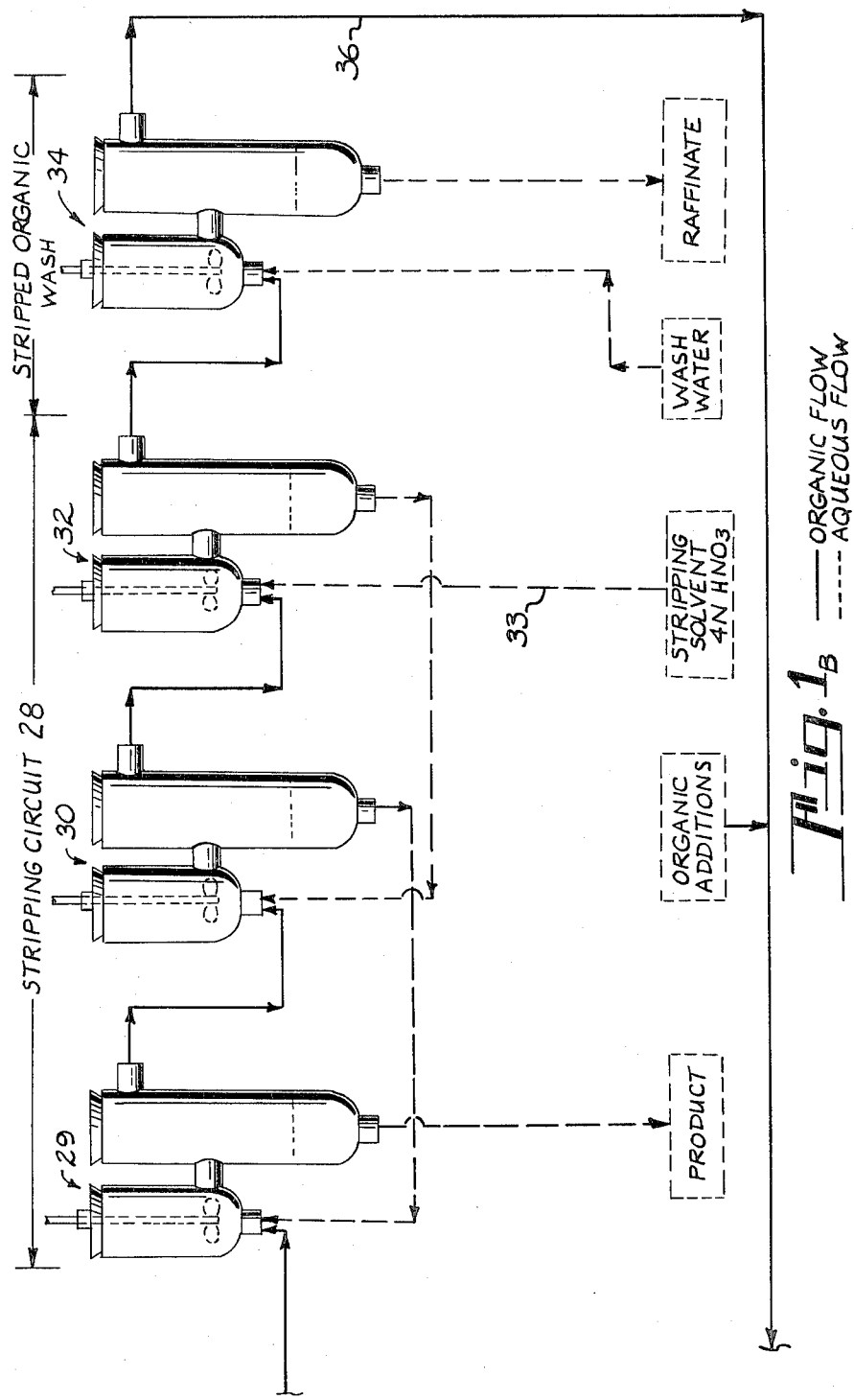

For a better understanding of the present invention, together with other and further objects, advantages and capabilities thereof, reference is made to the following disclosure and appended claims in connection with the above description of some of the aspects of the invention.

As the prior art recognized, recycle of extractants has generally resulted in lower efficiencies. It has been found that apparently this problem is associated with the inability of the recycled extraction system to dissolve the rhenium-extractant complex. Thus, the separation efficiency of the recycled extractant is lowered. This factor was unrecognized in the prior art. This difficulty is overcome by this invention by adding sufficient active organic extractant to the recycled extractant solution to provide an extractant solution that has essentially the same rhenium extraction efficiency as the extraction solution prior to initial contact with the molybdate solution containing the rhenium. Addition of appreciably lesser amounts of active extractant can result in lower rhenium extraction. Addition of quantities of active extractant in excess of the initial efficiency tends to result in molybdenum being extracted.

Any organic extraction solution can be used that is capable of separating rhenium from molybdenum such as those disclosed in U.S. Pat. No. 3,244,475 and U.S. Pat. No. 3,558,268. In each of these a quaternary amine is the active extractant. An aliphatic carrier such as kerosene with decyl alcohol is used as the solubilizer.

Stripping agents can vary such as ammonium thiocyanate, perchloric acid or nitric acid, however, nitric acid is the preferred stripping agent. When nitric acid is used, the active extractant additions are less than when the other stripping agents are employed.

While the process described herein can be operated as a continuous process and such is preferred, a batchwise process can be employed. It is believed, however, the present invention is the only known method that enables recycle of the organic disclosed in the prior art patents. This is achieved by the relatively simple test of determining the initial extraction efficiency of the initial organic solution, then after stripping the rhenium values, running a test on the organic to determine the extraction efficiency and thereafter adding sufficient quaternary amine to bring the mixture up to the efficiency of the initial organic solution.

To more fully illustrate the invention, particular reference is made to the drawing which depicts a flow sheet and an illustration of one embodiment is given.

The extraction circuit 10, consists of a series of three extraction units 12, 14 and 16. An aqueous feed stream 18 containing about 66 g/liter of molybdenum and 30 mg/liter of rhenium enters unit 16 at a rate of about 41 ml/min. The organic extractant solution 20 initially containing about 0.1% by volume of tricaprylyl monomethyl amine, 0.2% by volume of primary decyl alcohol and 99.7% by volume of kerosene enters unit 12 at the rate of 12.5 ml/min. The average retention time for the aqueous stream in each of the extraction units is about 2 minutes. The aqueous stream (raffinate) 22 exits from unit 12 and is essentially depleted of rhenium (less than 1 mg/liter). The organic phase enters washing unit 24 where it is cocurrently contacted with about 5.8 ml/min. of water. The washed organic enters the stripping circuit 28 consisting of three stripping units 29, 30 and 32. A 4N nitric acid solution 33 enters stripping unit 32 at the rate of about 8.3 ml/min. The organic enters unit 29 and exits depleted of rhenium from unit 32. The nitric acid which exits from unit 29 can be recycled to unit 32 until the concentration of rhenium has reached the desired level or can be removed directly to rhenium recovery. The organic is washed in unit 34 with about 5.8 ml/min. of water and the organic stream 36 exits from 34 and is tested for extraction efficiency. Sufficient active extractant tricaprylyl monomethyl amine is added to bring the extraction efficiency up to its original efficiency. In the foregoing example about 0.04 ml/min. addition is required. Generally a storage or buffer tank for stream 36 is desired and the additions are made thereto in batchwise quantities. The recycled organic is ready for use in unit 12.

While there has been shown and described what are at present considered the preferred embodiments of the invention, it will be obvious to those skilled in the art that various changes and modifications may be made therein without departing from the scope of the invention as defined by the appended claims.

What is claimed is:

1. In a process for the recovery of rhenium from aqueous molybdate solutions wherein an organic extractant solution is used to selectively extract rhenium from said molybdate solution and is thereafter stripped with a rhenium stripping agent to remove rhenium from the organic, the improvement comprising:
   a. establishing an initial rhenium extraction efficiency of an organic extraction solution comprising a quaternary amine as the active extractant, a primary alcohol as a solubilizer and an aliphatic solvent,
   b. measuring the rhenium extraction efficiency of said organic extraction solution after contact with said molybdate solution and subsequent contact with said rhenium stripping agent,
   c. adding sufficient organic active extractant to said organic extraction solution to attain substantially the initial rhenium extraction efficiency, and
   d. recycling said organic after said addition to contact said molybdate solutions.

2. An improvement according to claim 1 wherein said stripping agent is selected from the group consisting of nitric acid, perchloric acid and ammonium thiocyanate.

3. An improvement according to claim 2 wherein said quaternary amine is tricaprylyl monomethyl amine and said primary alcohol is decylalcohol.

4. An improvement according to claim 3 wherein said stripping agent is nitric acid.

5. A process according to claim 1 wherein said process is a continuous process.

\* \* \* \* \*